(No Model.)

G. W. WILLIAMS.
PISTON FOR STEAM ENGINES.

No. 262,192. Patented Aug. 1, 1882.

UNITED STATES PATENT OFFICE.

GEORGE W. WILLIAMS, OF WINONA, MINNESOTA, ASSIGNOR OF ONE-FOURTH TO WILLIAM E. SMITH, OF SAME PLACE.

PISTON FOR STEAM-ENGINES.

SPECIFICATION forming part of Letters Patent No. 262,192, dated August 1, 1882.

Application filed April 24, 1882. (No model.)

*To all whom it may concern:*

Be it known that I, GEORGE W. WILLIAMS, a citizen of the United States, and a resident of Winona, in the county of Winona and State of Minnesota, have invented a new and valuable Improvement in Pistons for Steam-Engines; and I do hereby declare that the following is a full, clear, and exact description of the construction and operation of the same, reference being had the annexed drawings, making a part of this specification, and to the letters and figures of reference marked thereon.

Figure 1:
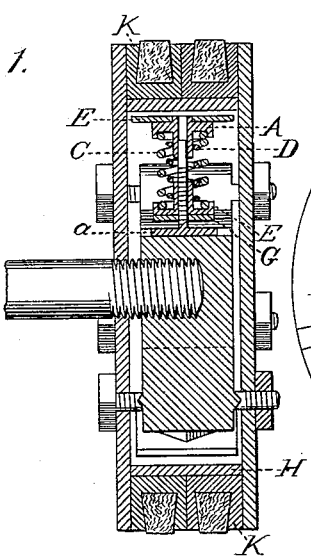
Figure 2:
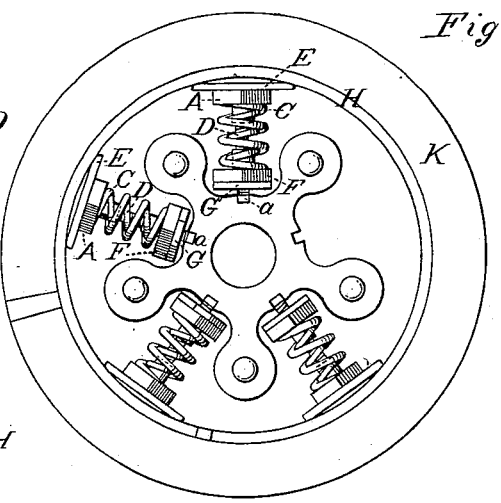
Figure 3:
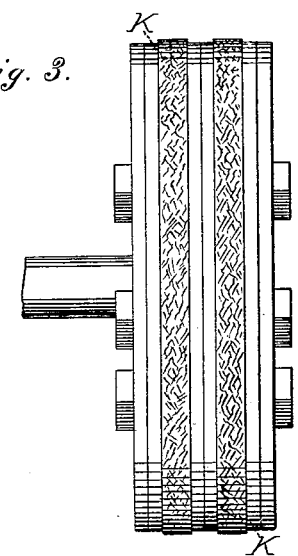
Figure 4:
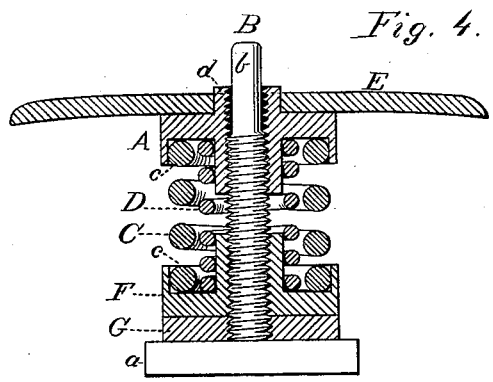

Figure 1 of the drawings is a representation of a section of the piston-head. Fig. 2 is a plan view, with one plate off to show the expanders. Fig. 3 is a plan view of the side. Fig. 4 is a sectional view of expander.

This invention has relation to piston-packing expanders; and it consists in the construction and novel arrangement of the threaded stem having a plain-turned end bearing, the sleeve-nuts and jam-nut, and the double springs between the sleeve-nuts, all as hereinafter set forth.

In the accompanying drawings, the letter B designates the guide bolt or stem of the expander, which is threaded from its head toward the end bearing, b, which is turned in plain cylindrical form.

G indicates the jam-nut, which is arranged on the stem next its head portion a, being followed by the inner sleeve-nut, F, the outer face of which is recessed at e to form a receptive bearing for the inner ends of the springs C and D.

A represents the outer sleeve-nut, which is recessed on its inner face to form a bearing, c, for the outer ends of the spiral springs. The outer face of this sleeve-nut is formed with a bearing, d, on which is seated the chord-spring or equalizer E, the ends of which bear against the inside surface of the inside packing-ring, H.

K represents the outer packing-rings, which may be made in any ordinary manner, or may be recessed and provided with compressed asbestus bearings, filling the recesses in a compact and solid manner.

The spiral springs C and D are of different diameters, and are reversely coiled, one being turned or wound to the right and the other to the left. The smaller spring, C, is placed inside the larger spring, D, and when the expander is in working position adds its tension-strain to that of the outer spring, so that the required strain or expanding force is obtained, while the elasticity of the springs is preserved in the smallest possible space.

In this expander it has been designed to economize space, which is necessarily limited in the structures to which it is applied.

By engaging the outer sleeve-nut, A, with the thread of the stem the springs C and D can be held under full tension while placing the expander in position. When the sleeve-nut A is released from the thread of the stem the full tension-strain of the spiral springs C and D will at once be thrown on the chord-spring or foot-spring equalizer E, the ends of which bear against the inside ring.

By means of the inner sleeve-nut and the jam-nut means are provided in reserve to re-adjust the springs C and D to increase their tension after the packing-rings have become sufficiently worn to require it.

The sleeve-nuts act as guides for the springs between them, and these springs in turn protect the thread of the bolt-stem and support the sleeve-nuts.

Two or more concentric spiral springs, one within the other, have been used in car-springs, and are not broadly claimed herein.

A number of screw-bolts arranged radially with the piston-rod, having their heads resting in recesses or pockets of the piston-head, in combination with followers, against the inner packing-rings and spiral springs which surround the bolts, and nuts upon said bolts, between which the springs are arranged, their inner ends resting in concentric pockets in said nuts and their outer ends in like pockets of the followers, is not new, and neither is said construction claimed herein.

Having described this invention, what I claim, and desire to secure by Letters Patent, is—

In a piston-packing expander, the combination, with the threaded stem B and the sleeve-nut A, of the springs C D, the sleeve-nut F, jam-nut G, and the chord-spring or equalizer E, sustantially as specified.

In testimony that I claim the above I have hereunto subscribed my name in the presence of two witnesses.

GEORGE W. WILLIAMS.

Witnesses:
  C. G. MAYBURY,
  JOHN SPELLMAN.